(12) United States Patent
Tenny et al.

(10) Patent No.: US 8,861,451 B2
(45) Date of Patent: Oct. 14, 2014

(54) METHOD AND APPARATUS OF DEACTIVATING CARRIERS IN WIRELESS COMMUNICATIONS

(75) Inventors: Nathan E. Tenny, San Diego, CA (US); Wanshi Chen, San Diego, CA (US); Jelena M. Damnjanovic, San Diego, CA (US); Masato Kitazoe, Tokyo (JP); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/191,295

(22) Filed: Jul. 26, 2011

(65) Prior Publication Data
US 2012/0039269 A1   Feb. 16, 2012

Related U.S. Application Data

(60) Provisional application No. 61/373,689, filed on Aug. 13, 2010.

(51) Int. Cl.
| | |
|---|---|
| *H04W 4/00* | (2009.01) |
| *H04L 5/00* | (2006.01) |
| *H04W 84/14* | (2009.01) |
| *H04W 72/00* | (2009.01) |
| *H04W 88/08* | (2009.01) |
| *H04W 84/06* | (2009.01) |
| *H04W 28/18* | (2009.01) |
| *H04W 84/04* | (2009.01) |

(52) U.S. Cl.
CPC ............. *H04L 5/0098* (2013.01); *H04W 84/14* (2013.01); *H04W 72/00* (2013.01); *H04W 88/08* (2013.01); *H04W 84/06* (2013.01); *H04W 28/18* (2013.01); *H04L 5/0042* (2013.01); *H04W 84/045* (2013.01)
USPC .......................................................... 370/329

(58) Field of Classification Search
USPC ................................................. 370/329–331
See application file for complete search history.

(56) References Cited

U.S. PATENT DOCUMENTS

| | | | | |
|---|---|---|---|---|
| 8,385,959 | B2 * | 2/2013 | Lee et al. ........................ | 455/509 |
| 8,526,322 | B2 * | 9/2013 | Jung et al. ...................... | 370/252 |
| 2010/0322079 | A1 * | 12/2010 | Kitazoe et al. ................. | 370/241 |
| 2011/0170418 | A1 * | 7/2011 | Sagfors et al. ................. | 370/241 |
| 2012/0263129 | A1 | 10/2012 | Noh et al. | |
| 2013/0039202 | A1 * | 2/2013 | Feuersanger et al. .......... | 370/252 |
| 2013/0051351 | A1 * | 2/2013 | Seo et al. ....................... | 370/329 |
| 2013/0128829 | A1 * | 5/2013 | Sebire ............................ | 370/329 |

OTHER PUBLICATIONS

"Uplink Activation & Deactivation of SCells", Nokia Corporation, Nokia Siemens Networks, Jun. 28, 2010.*

(Continued)

*Primary Examiner* — Hassan Kizou
*Assistant Examiner* — Abdullahi Ahmed
(74) *Attorney, Agent, or Firm* — Arent Fox LLP

(57) ABSTRACT

Methods and apparatuses are provided for determining whether to deactivate one or more uplink carriers based at least in part on determining deactivation of a downlink carrier. A linking of the one or more uplink carriers to the downlink carrier can be obtained for determining whether to deactivate the one or more uplink carriers. The linking can be a system information block linking, a carrier indicator field linking, a pathloss linking, an uplink timing reference linking, and/or the like. The one or more uplink carriers can be deactivated based on the linking and/or another linking to one or more other downlink carriers.

42 Claims, 11 Drawing Sheets

(56) References Cited

OTHER PUBLICATIONS

"Mechanisms of UL Activation and Deactivation", Alcatel-Lucent Shanghai Bell, Jun. 28, 2010.*
3GPP TS 36.300 V10.0.0 (Jun. 2010), Technical Specification, 3rd Generation Partnership Project (3GPP), Section 11.2, p. 82.
Alcatel-Lucent et al: "Mechanisms of UL Activation and Deactivation", 3GPP Draft; R2-103853 Ulactdeactvo 3, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; Jun. 28, 2010, Jun. 22, 2010, XP050451259, [retrieved on Jun. 22, 2010].
International Search Report and Written Opinion—PCT/US2011/045601—ISA/EPO—Oct. 26, 2011.
Nokia Corporation et al: "Uplink Activation & Deactivation of SCells", 3GPP Draft; R2-103536 UL Activation Deactivation, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; Jun. 28, 2010, Jun. 22, 2010, XP050451113, [retrieved on Jun. 22, 2010].
NTT Docomo et al: "UL SCell activation/deactivation", 3GPP Draft; R2-103963, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; Jun. 28, 2010, Jun. 22, 2010, XP050451316, [retrieved on Jun. 22, 2010].
RAN WG4: "Reply LS on pathloss measurements in CA scenarios", 3GPP Draft; R2-103494-R4-102260, 3rd Generation Partnership Project (3GPP), Mobile Competence Centre ; 650, Route des Lucioles ; F-06921 Sophia-Antipolis Cedex ; France, vol. RAN WG2, No. Stockholm, Sweden; Jul. 2, 2010, Jun. 16, 2010, XP050423523, [retrieved on Jun. 16, 2010].
TSG-RAN WG2 (RAN2): "LS on pathloss measurements in CA scenarios" 3GPP Draft; R4-101855, 3rd Generation Partnership Project (3GPP), Mobile Competence Centre ; 650, Route des Lucioles ; F-06921 Sophia-Antipolis Cedex ; France, vol. RAN WG4, No. Montreal, Canada; May 10, 2010, May 20, 2010, XP050426830, [retrieved on May 20, 2010].
NTT Docomo, Inc., "DL/UL CC activation and deactivation," 3GPP TSG-RAN2#70, R2103223, May, 10th -14th 2010, XP050423304.
Huawei, Issues on Cross-Carrier PDCCH Indication for Carrier Aggregation, 3GPP TSG RAN WG1 Meeting #58 (R1-093047), Mobile Competence Centre, Aug. 18, 2009.
Nokia Corporation, Uplink Activation & Deactivation of Scells, 3GPP TSG-RAN WG2 Meeting #70BIS (R2-103536), Mobile Competence Centre, Jun. 22, 2010, V Ran WG2 N Stockholm.
Japanese Office Action dated Jan. 28, 2014.

* cited by examiner

METHOD AND APPARATUS OF DEACTIVATING CARRIERS IN WIRELESS COMMUNICATIONS

CLAIM OF PRIORITY UNDER 35 U.S.C. §119

The present application for Patent claims priority to Provisional Application No. 61/373,689 entitled "APPARATUS AND METHOD FOR UPLINK CARRIER DEACTIVATION IN WIRELESS COMMUNICATIONS" filed Aug. 13, 2010, and assigned to the assignee hereof and hereby expressly incorporated by reference herein.

BACKGROUND

1. Field

The following description relates generally to wireless network communications, and more particularly to carrier activation and deactivation.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In one example, devices can be configured with a plurality of carriers from one or more base stations to increase data throughput, signal diversity, and/or the like. For example, a base station can configure a plurality of downlink carriers, which can each have one or more corresponding uplink carriers. In an example, the base station can provide information linking a downlink carrier and a corresponding uplink carrier in a system information block or similar signaling. In addition, the base station can schedule one or more uplink carriers using cross-carrier scheduling such that the one or more uplink carriers are scheduled over a downlink carrier (e.g., using a control channel message). In addition, uplink carriers can be linked to a specific one of the plurality of downlink carriers (e.g., independent of linking from system information and/or cross-carrier scheduling) for the purposes of determining pathloss, an uplink timing reference, and/or the like.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with deactivating carriers in a multicarrier wireless communication system. Based on determining that a base station deactivates one of multiple downlink carriers, a corresponding device can determine one or more uplink carriers to deactivate. In one example, upon receiving an indication of deactivation for a downlink carrier, the device can determine an uplink carrier linked to the downlink carrier based at least in part on received system information, and can deactivate the corresponding uplink carrier. In additional examples, the device can determine an uplink carrier linked to the downlink carrier based at least in part on a carrier indicator field-linking in cross-carrier scheduling, pathloss-linking, uplink timing reference-linking, and/or the like, for deactivating. Thus, uplink carriers that are not being used due to deactivation of a related downlink carrier can be deactivated to conserve resources and/or processing required to receive and process signals received over the uplink carriers.

According to an example, a method for deactivating carriers in wireless communications is provided. The method includes receiving an indication of deactivation of a downlink carrier by an access point and determining a linking between one or more uplink carriers and the downlink carrier based at least in part on parameters received in system information from the access point. The method further includes deactivating the one or more uplink carriers based at least in part on the linking.

In another aspect, an apparatus for deactivating carriers in wireless communications is provided. The apparatus includes at least one processor configured to receive an indication of deactivation of a downlink carrier by an access point and determine a linking between one or more uplink carriers and the downlink carrier based at least in part on parameters received in system information from the access point. The at least one processor can be further configured to deactivate the one or more uplink carriers based at least in part on the linking. The apparatus also includes a memory coupled to the at least one processor.

In yet another aspect, an apparatus for deactivating carriers in wireless communications is provided that includes means for receiving an indication of deactivation of a downlink carrier by an access point and means for determining a linking between one or more uplink carriers and the downlink carrier based at least in part on parameters received in system information from the access point. The apparatus further includes means for deactivating the one or more uplink carriers based at least in part on the linking.

Still, in another aspect, a computer-program product for deactivating carriers in wireless communications is provided including a computer-readable medium having code for causing at least one computer to receive an indication of deactivation of a downlink carrier by an access point. The computer-readable medium further includes code for causing the at least one computer to determine a linking between one or more uplink carriers and the downlink carrier based at least in part on parameters received in system information from the access point and code for causing the at least one computer to deactivate the one or more uplink carriers based at least in part on the linking.

Moreover, in an aspect, an apparatus for deactivating carriers in wireless communications is provided that includes a downlink carrier deactivation determining component for receiving an indication of deactivation of a downlink carrier by an access point and an uplink carrier associating component for determining a linking between one or more uplink carriers and the downlink carrier based at least in part on parameters received in system information from the access point. The apparatus further includes an uplink carrier deactivating component for deactivating the one or more uplink carriers based at least in part on the linking.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
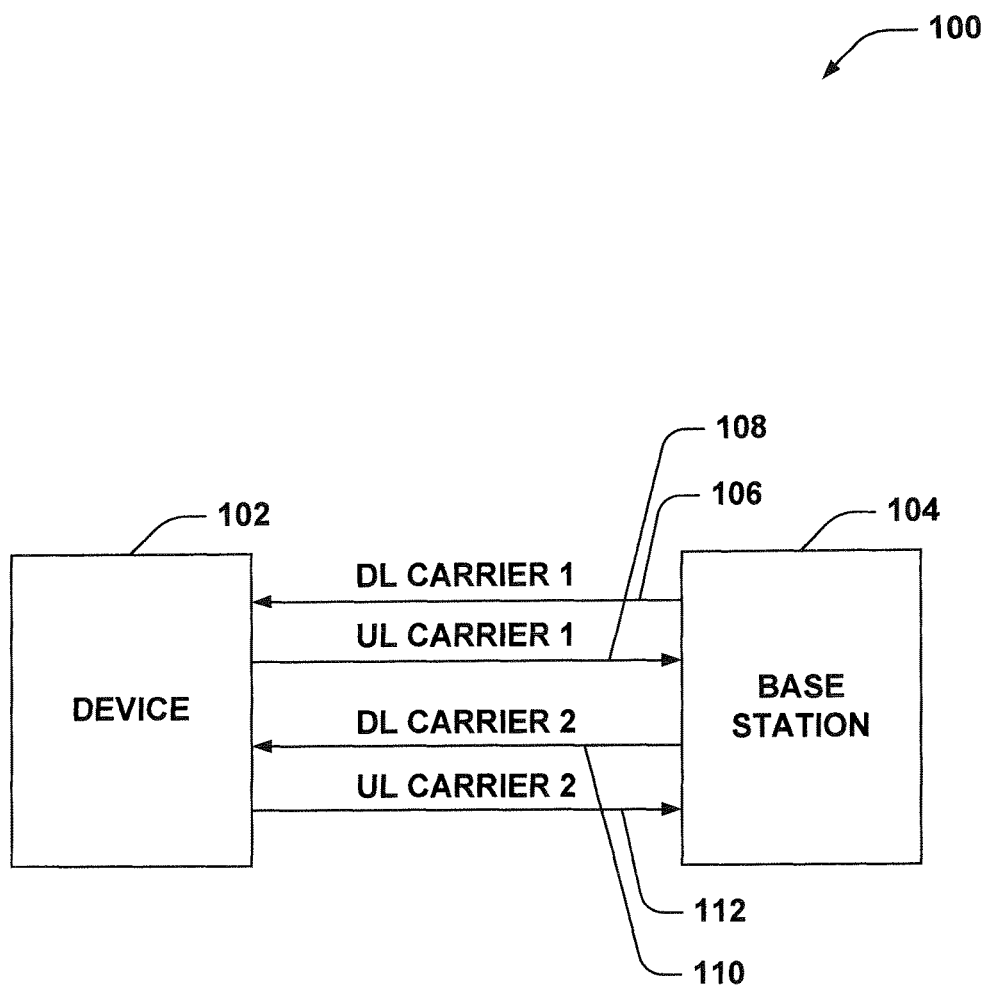
FIG. 1 is a block diagram of an aspect of a system that facilitates assigning multiple uplink and downlink carriers.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, uplink (UL) carriers at a wireless device can be deactivated based at least in part on deactivation of a related downlink (DL) carrier. For example, depending on a relationship between an UL and DL carrier, a device can determine whether to deactivate the UL carrier when the DL carrier is deactivated. Deactivating an UL carrier at the device can include reducing a number of reference signals transmitted over the UL carrier, reducing a search space related to resource grants for the deactivated UL carrier, changing a pathloss measurement or UL timing reference related to the UL carrier, and/or the like. Such reducing, in the above examples, can include reducing to cessation. In this regard, for example, the UL carrier, though deactivated, can remain configured at the device. In addition, the relationship between the UL and DL carrier causing deactivation can correspond to a linking in system information, cross-carrier signaling, pathloss measuring, UL timing reference, and/or the like.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates communicating over multiple carriers in a wireless network. System 100 comprises a device 102 that communicates with a base station 104 to receive wireless network access. Device 102 can be a UE, modem (or other tethered device), a base station (e.g., a movable base station such as a femtocell base station, mobile base station, etc.), a portion thereof, and/or the like. Base station 104 can be a macrocell, femtocell, picocell, and/or similar base station, a mobile base station, relay node, a UE (e.g., where device 102 is a UE communicating in peer-to-peer or ad-hoc mode), a portion thereof, and/or the like.

According to an example, device 102 and base station 104 can communicate over multiple carriers, as shown. In this regard, base station 104 can assign DL carrier 1 106 to device 102 and can schedule resources to device 102 related to receiving communications over DL carrier 1 106. In addition, base station 104 can assign a corresponding UL carrier 1 108 to device 102. UL carrier 1 108 can be linked to DL carrier 1 106 according to system information broadcast in signals from base station 104, such as a system information block (SIB) or similar signaling that can identify the resources related to the DL carrier 1 106 and corresponding uplink carrier 1 108. Such linking can be referred to herein as SIB-linking, or corresponding carriers can be referred to as SIB-linked carriers. In addition, the set of SIB-linked DL carrier 1 106 and UL carrier 1 108, or any SIB-linked carriers, can be referred to as a SCell. Similarly, base station 104 can assign DL carrier 2 110 to device 102 along with a corresponding SIB-linked UL carrier 2 112 to form another SCell.

In another example, base station 104 can schedule at least a portion of resources for UL carrier 1 108 over a control channel provided by DL carrier 1 106. In this example, base station 104 can identify DL carrier 1 106 in a carrier indicator field (CIF) in the scheduling assignment for UL carrier 1 108 transmitted over the control channel. This can be referred to as a cross-carrier scheduling configuration, and the relationship between the DL carrier 1 106 and UL carrier 1 108 can be referred to herein as CIF-linking (and corresponding carriers can be called CIF-linked carriers). In addition, for example, base station 104 can schedule at least a portion of resources of UL carrier 1 108 using DL carrier 2 110, such that UL carrier 1 108 is SIB-linked to DL carrier 1 106, but CIF-linked to DL carrier 2 110.

Furthermore, for example, device 102 can compute a pathloss to base station 104 based on signals received from base station 104 over a DL carrier corresponding to a UL carrier. In one example, base station 104 can specify a DL carrier for device 102 to utilize in computing pathloss, which can differ from the DL carrier that is linked to a UL carrier assigned to device 102 (e.g., in SIB- or CIF-linking). For example, base station 104 can specify a DL carrier closer in frequency to the UL carrier to allow device 102 to perform a more accurate estimation of pathloss. In this regard, the UL carriers 1 108 and 2 112 can be pathloss-linked to one of DL carrier 1 106 or 2 110. In a similar example, base station 104 can specify a DL carrier for device 102 to utilize as an UL timing reference; thus, UL carrier 1 108 and/or 2 112 can be UL timing reference-linked to DL carrier 1 106 and/or 2 110.

In one example, base station 104 can deactivate DL carrier 1 106 and/or DL carrier 2 110. Device 102 can accordingly deactivate UL carrier 1 108 and/or UL carrier 2 112 depending on a linking to the deactivated DL carrier. For example, base station 104 can deactivate DL carrier 1 106 and can notify device 102 of the deactivation. Device 102, in this regard, can determine a linking of UL carrier 1 108 to DL carrier 1 106. This can include determining whether UL carrier 1 108 is SIB-linked, CIF-linked, pathloss-linked, UL timing reference-linked, or otherwise linked to DL carrier 1 106. If so (and/or if UL carrier 1 108 is not linked to another DL carrier according to one or more types of linking, for example), device 102 can deactivate UL carrier 1 108. Device 102 can similarly determine whether UL carrier 2 112 is linked to DL carrier 1 106 (and/or is not linked to another DL carrier) in determining whether to deactivate UL carrier 2 112.

In an example, as described, device 102 can deactivate UL carrier 1 108 (and/or UL carrier 2 112) at least in part by reducing (e.g., to the point of cessation or otherwise) reference signal transmission over UL carrier 1 108. In another example, device 102 can deactivate UL carrier 1 108 at least in part by reducing (e.g., to the point of cessation or otherwise) search space for resource grants or other scheduling information corresponding to UL carrier 1 108 (e.g., on one or more active DL carriers). Moreover, device 102 can deactivate UL carrier 1 108 at least in part by modifying pathloss measurement behavior related to UL carrier 1 108. In addition, though described in terms of deactivating UL carriers based on DL carriers, it is to be appreciated that the concepts can be applied to deactivate DL carriers based on UL carriers as well, in an example.

Figure 2:
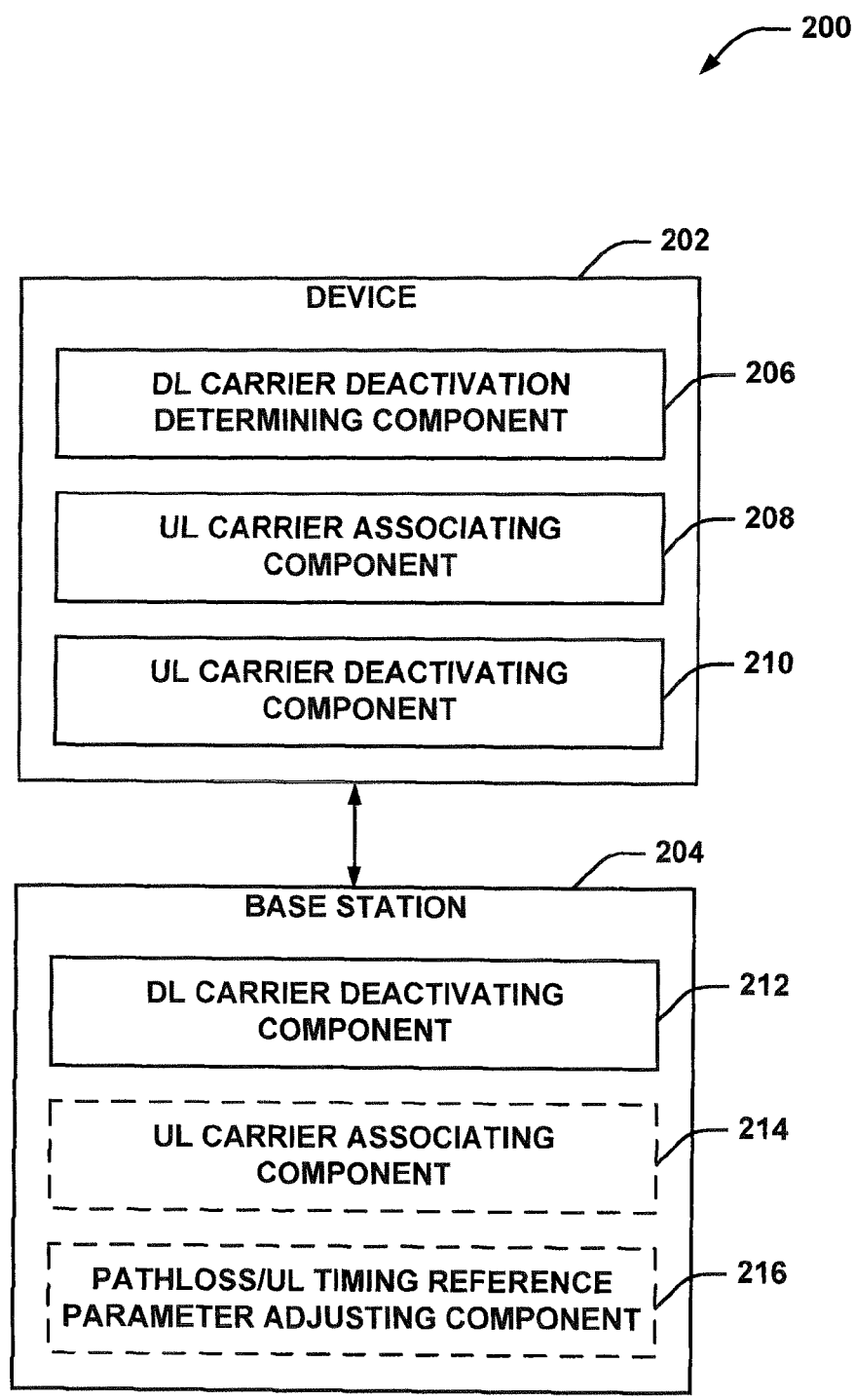
FIG. 2 is a block diagram of an aspect of a system for deactivating one or more uplink carriers.

Turning to FIG. 2, an example wireless communication system 200 is displayed that facilitates deactivating UL carriers based at least in part on a linking to one or more deactivated DL carriers. System 200 comprises a device 202 that can communicate with base station 204 to receive access to a wireless network, as described. Moreover, as described, base station 204 can assign multiple DL and UL carriers to device 202 to promote transmit diversity, improve data rate, and/or the like. Device 202 can be a UE, modem, etc., and base station 204 can be a macrocell, femtocell, picocell, or similar base station, etc., as described.

Device 202 can comprise a DL carrier deactivation determining component 206 that determines deactivation of a DL carrier, a UL carrier associating component 208 that determines whether one or more UL carriers are linked to the deactivated DL carrier, and a UL carrier deactivating component 210 that determines whether to deactivate the one or more UL carriers based on a link to the deactivated DL carrier.

Base station 204 can comprise a DL carrier deactivating component 212 for deactivating one or more DL carriers, an optional UL carrier associating component 214 for storing an association between the one or more DL carriers and one or more UL carriers, and an optional pathloss/UL timing reference parameter adjusting component 216 for modifying one or more parameters related to pathloss requirements or timing based at least in part on determining one or more UL carriers related to the one or more DL carriers.

According to an example, DL carrier deactivating component 212 can deactivate one or more DL carriers, and DL carrier deactivation determining component 206 can determine the deactivation of one or more DL carriers. This can include receiving an indication of deactivation from the DL carrier deactivating component 212, inferring deactivation based at least in part on determining whether signals are received over the one or more DL carriers for a period of time, etc. Upon determining deactivation of the one or more DL carriers, UL carrier associating component 208 can determine whether the one or more deactivated DL carriers are related to one or more UL carriers. In an example, UL carrier associating component 208 can determine whether the one or more deactivated DL carriers are linked to one or more UL carriers, as described. The linking can include substantially any sort of linking, such as SIB-linking, CIF-linking, pathloss-linking, UL timing reference-linked, another kind of linking, a combination thereof, and/or the like.

In an example, UL carrier associating component 208 can store linking information for one or more carriers. In this example, base station 204 can assign DL carriers to device 202 for communicating therewith. Base station 204 can indicate a linking to a UL carrier for device 202 to utilize in transmitting to base station 204. In one example, the linking can be indicated in system information signals (e.g., SIB) broadcast to one or more devices. As described, the DL carrier/UL carrier linking can be referred to as a SCell. Thus, for example, UL carrier associating component 208 can store an indication of SIB-linking between the DL and UL carriers. In another example, base station 204 can link a DL carrier to a UL carrier by indicating the linking over a control channel message (e.g., in a CIF) in cross-carrier scheduling for carrier aggregation. Thus, for example, UL carrier associating component 208 can store an indication of CIF-linking between the DL and UL carriers. Similarly, base station 204 can specify a DL carrier to be used for measuring pathloss and/or as an UL timing reference for a UL carrier. In this example, UL carrier associating component 208 can store a pathloss-linking or UL timing reference-linking between the UL carrier and the DL carrier. UL carrier associating component 214 can optionally similarly store a linking between DL carriers and UL carriers as assigned.

For example, upon DL carrier deactivation determining component 206 receiving an indication of, or otherwise determining, deactivation of a DL carrier, UL carrier associating component 208 can determine whether the DL carrier is SIB-linked to any UL carriers. This can include determining whether the DL carrier is part of any SCells. If so, UL carrier deactivating component 210 can determine to deactivate the UL carrier(s) based at least in part on the SIB-linking. In another example, UL carrier associating component 208 can additionally or alternatively determine whether the DL carrier is CIF-linked, pathloss-linked, UL timing reference-linked, and/or the like, to any UL carriers, and UL carrier deactivating component 210 can accordingly determine to deactivate the UL carrier(s) based at least in part on the additional linking. Moreover, for example, UL carrier associating component 208 can determine whether the UL carrier(s) is/are linked to any other active DL carriers before determining to deactivate the UL carrier(s) according to one or more types of linking described above.

Thus, for example, upon determining one or more UL carriers linked to the DL carrier, UL carrier associating component 208 can determine whether the one or more UL carriers are SIB-linked, CIF-linked, pathloss-linked, UL timing reference-linked, etc. to any other active DL carriers, and if not, UL carrier deactivating component 210 can determine to deactivate the UL carrier. If the one or more UL carriers are at least one of SIB-linked, CIF-linked, pathloss-linked, UL timing reference-linked, etc. to any other active DL carriers, the UL carrier can remain active. In this regard, various permutations of linking determination for the deactivated DL carrier and further for linked UL carriers to other DL carriers are possible for determining whether to deactivate a UL carrier.

In a specific example, base station 204 can schedule a UL carrier from SIB without using CIF scheduling. Thus, if a UL carrier can be scheduled from certain DL carriers using CIF, and also from other DL carriers using SIB without CIF, UL carrier associating component 208 can thus determine whether a UL carrier related to a deactivated DL carrier is SIB-linked and determine whether the UL carrier is CIF-linked to any other active DL carriers as part of determining whether to deactivate the UL carrier. If not, then UL carrier deactivating component 210 can determine to deactivate the UL carrier.

In another specific example, UL carrier associating component 208 can determine whether one or more UL carriers are pathloss-linked and/or UL timing reference-linked to a deactivated DL carrier based at least in part on a previously stored association. If so, in one example, UL carrier deactivating component 210 can determine to deactivate the one or more UL carriers for lack of pathloss reference and/or UL timing reference.

In another example, UL carrier associating component 208 can associate the one or more UL carriers with another active DL carrier related to base station 204 for pathloss and/or UL timing reference. This can be based on an indication from DL carrier deactivating component 212, in one example, of the other active DL carrier to pathloss- and/or UL timing reference-link to the one or more UL carriers. In this regard, for example, pathloss/UL timing reference parameter adjusting component 216 can adjust one or more parameters related to measuring pathloss and/or timing over the UL carrier resulting in relaxed requirements for reporting pathloss and/or utilizing timing with base station 204. Thus, though the pathloss/UL timing reference-linked carrier is deactivated, device 202 can continue to measure pathloss and/or uplink timing using the other active DL carrier based on the relaxed requirements.

Though described above as determining to deactivate one or more UL carriers, UL carrier deactivating component 210 can additionally perform the deactivating. In an example, UL carrier deactivating component 210 can deactivate the one or more UL carriers at least in part by reducing a number of reference signals transmitted over the UL carrier, reducing a search space related to resource grants or other scheduling information for the deactivated UL carrier, changing a pathloss measurement or UL timing reference related to the UL carrier, and/or the like. Such reducing, in the above examples, can include reducing to cessation. In addition, as described above, deactivating the one or more UL carriers at UL carrier deactivating component 210 can include reducing (e.g., to cessation or otherwise) processing of scheduling information related to the one or more UL carriers (e.g., as potentially received over a related DL carrier). For example, this can include reducing attempts to receive scheduling information related to the one or more uplink carriers based at least in part on avoiding receiving over intervals during which the scheduling information is transmitted by a corresponding base station. In one example, the intervals can be determined based at least in part on a configuration of carriers in the scheduling information, an association between the one or more uplink carriers and an active downlink carrier in the system information, and/or the like.

Figure 3:
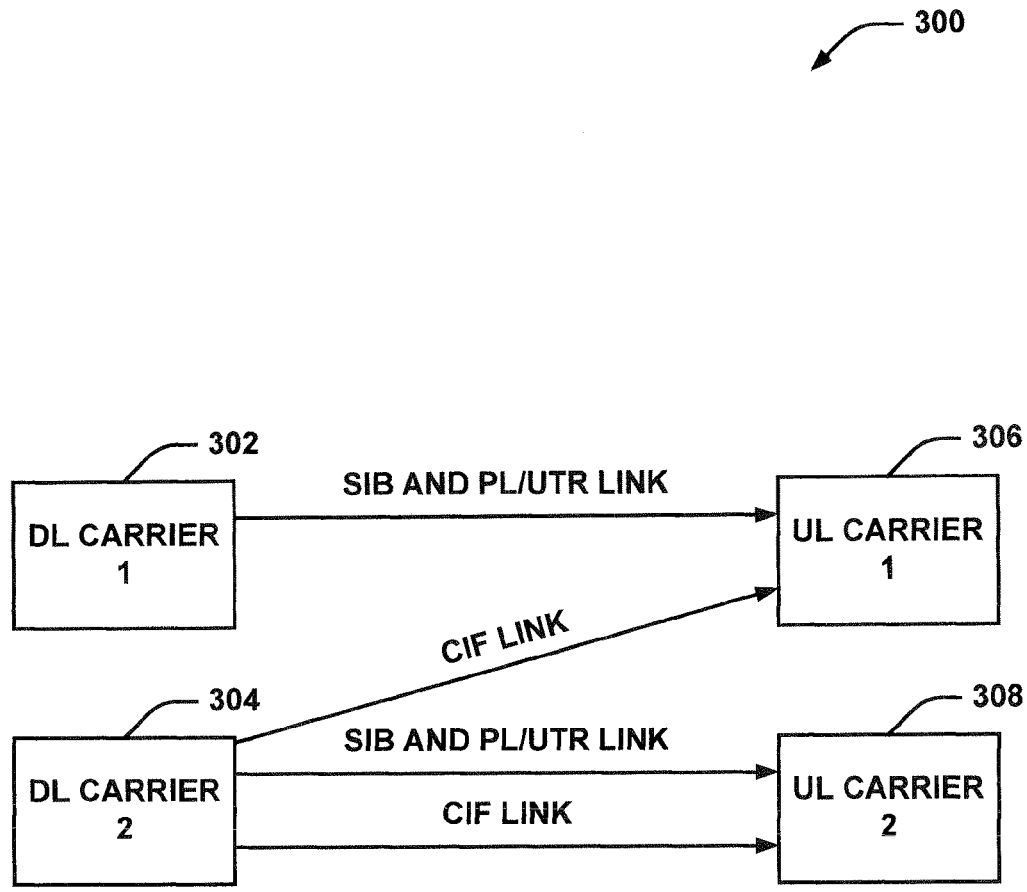
FIG. 3 is a diagram of an example carrier linking configuration.

Turning now to FIG. 3, example carrier configuration assignments 300 are illustrated. The carrier assignments 300 can be from a base station to a device, as described. Thus, for example, a base station can assign DL carriers 1 302 and 2 304 to a device. In addition, the base station can assign UL carriers 1 306 and 2 308 to the device based on an indication in system information, such as a SIB, (SIB-linked), a CIF in a control channel message (CIF-linked), a pathloss (PL) and/or UL timing reference (UTR) indication received over control signaling, etc. (PL/UTR-linked), and/or the like, as described above. In the depicted example, UL carrier 1 306 can be CIF-linked to DL carrier 2 304. UL carrier 1 306, however, can be SIB-linked and PL/UTR-linked to DL carrier 1 302. UL carrier 2 308 can be SIB-linked, PL/UTR-linked, and CIF-linked to DL carrier 2 304.

For example, the base station can deactivate DL carrier 1 302, and the device can determine whether to deactivate UL carrier 1 306 based at least in part on a linking to DL carrier 1 302. In an example, upon being notified of DL carrier 1 302 deactivation, the device can determine whether UL carrier 1 306 or UL carrier 2 308 are SIB-linked to DL carrier 1 302. Since UL carrier 1 306 is SIB-linked to DL carrier 1 302 (e.g., UL carrier 1 306 and DL carrier 1 302 correspond to a SCell), the UE can deactivate UL carrier 1 306. In another example, the device can ensure UL carrier 1 306 is not SIB-linked to any other DL carriers before deactivating. Moreover, for example, the device can ensure UL carrier 1 306 is not CIF-linked to any DL carriers before deactivating (e.g., in this case, UL carrier 1 306 is CIF-linked to DL carrier 2 304, and thus is not deactivated).

In another example, the device can determine UL carrier 1 306 is PL/UTR-linked to DL carrier 1 302 and can deactivate the UL carrier 1 306 due to lack of pathloss reference or UL timing reference. In yet another example, as described, the device can select a different DL carrier (e.g., DL carrier 2 304) for the pathloss and/or UL timing reference for UL carrier 1 306, and the base station can relax pathloss and/or timing requirements for UL carrier 1 306.

In another example, since UL carrier 1 306 is CIF-linked to DL carrier 2 304, the device can determine not to deactivate UL carrier 1 306 upon deactivation of DL carrier 1 302 so it can still receive additional or alternate scheduling or other control data over DL carrier 2 304. In another example, where DL carrier 2 304 is deactivated, the device can determine whether to deactivate UL carrier 1 306 or UL carrier 2 308 based on whether the carriers are SIB-linked, CIF-linked, PL/UTR-linked, etc. to DL carrier 2 304. In one example, due to the CIF-linking, the device can deactivate UL carrier 1 306 since it will no longer receive control data related to deactivated DL carrier 2 304. In another example, the device can leave UL carrier 1 306 active since it is still SIB-linked to DL carrier 1 302.

Referring to FIGS. 4-7, example methodologies relating to determining to deactivate one or more carriers are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
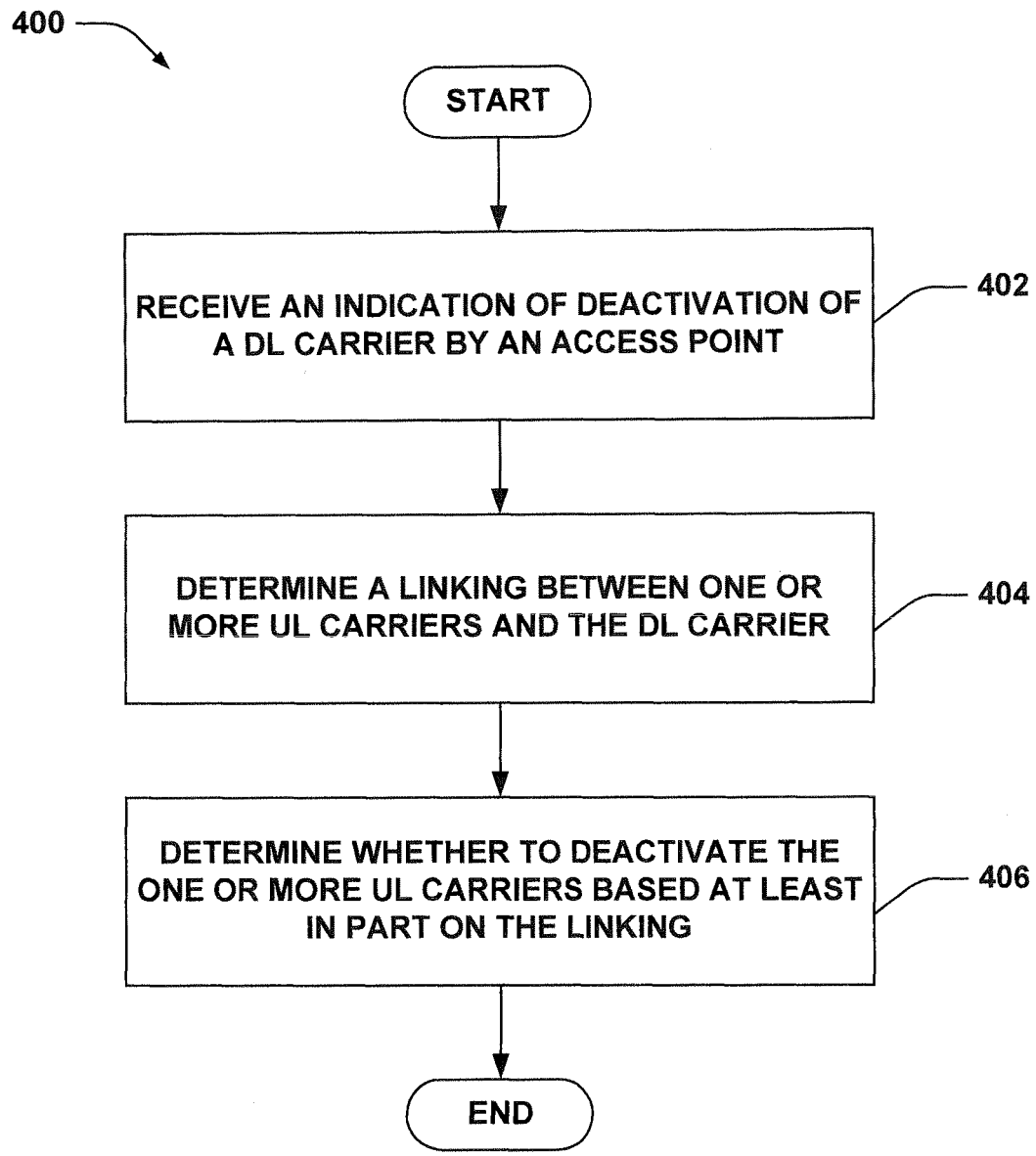
FIG. 4 is a flow chart of an aspect of a methodology that deactivates one or more uplink carriers based on a linking to a downlink carrier.

Turning to FIG. 4, an example methodology 400 for deactivating one or more uplink carriers is illustrated. At 402, an indication of deactivation of a DL carrier by an access point can be received. As described, this can be at least one of received from the access point, determined based at least in part on whether signals are received over the DL carrier, etc. At 404, a linking between one or more UL carriers and the DL carrier can be determined. For example, this can be a SIB-linking, CIF-linking, pathloss-linking, UL timing reference-linking, and/or similar linkings, and the determination can also include determining whether the UL carriers are linked to any other DL carriers. At 406, it can be determined whether to deactivate the one or more UL carriers based at least in part on the linking. For example, as described, additional linkings can be determined for deciding whether to deactivate the one or more UL carriers.

Figure 5:
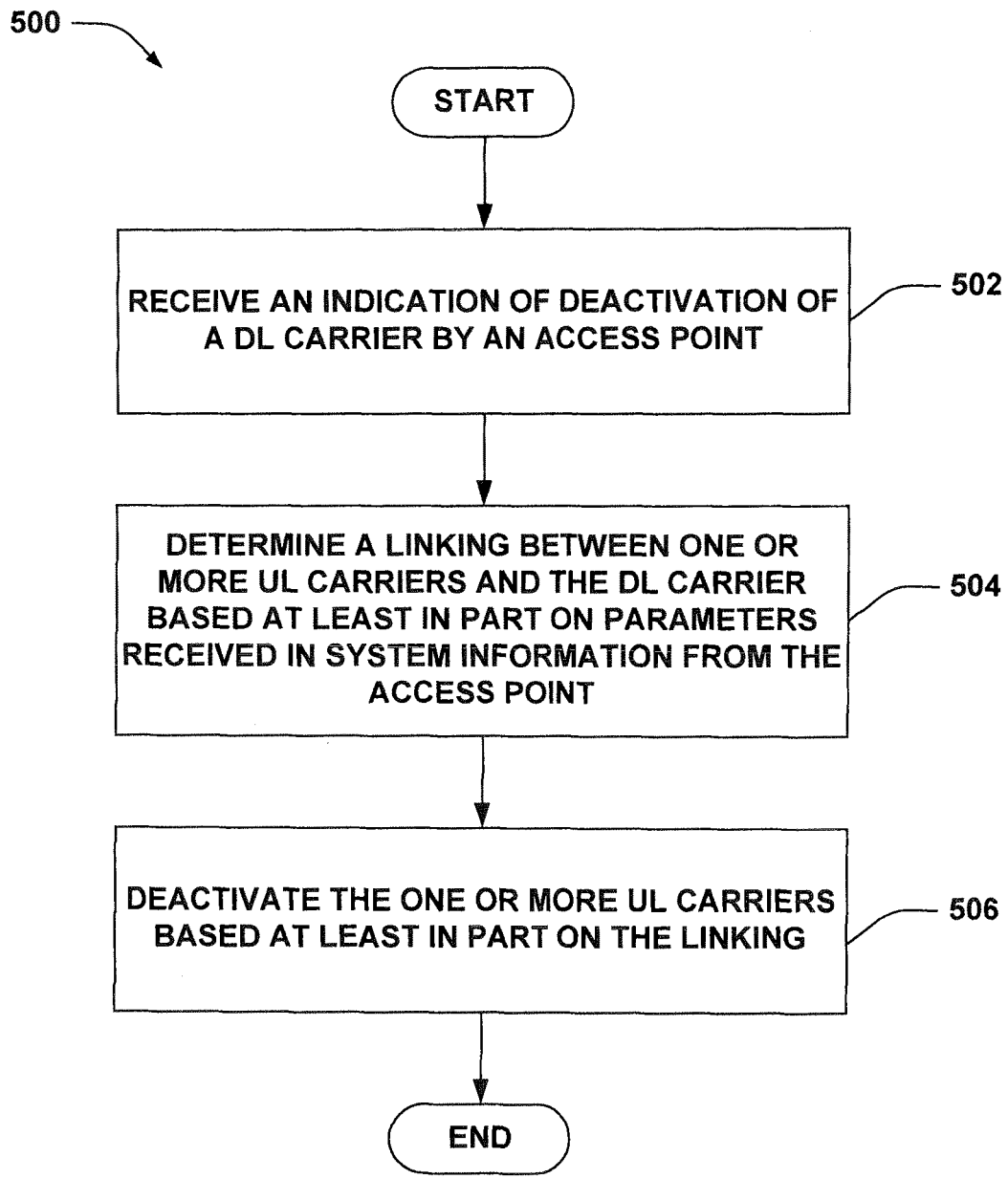
FIG. 5 is a flow chart of an aspect of a methodology for deactivating one or more uplink carriers linked to a downlink carrier in system information.

Referring to FIG. 5, an example methodology 500 is depicted for deactivating one or more uplink carriers. At 502, an indication of deactivation of a DL carrier by an access point can be received. As described, this can be received from the access point, determined based at least in part on whether signals are received over the DL carrier, etc. At 504, a linking between one or more UL carriers and the DL carrier can be determined based at least in part on parameters received in system information from the access point. In addition, other linkings can be determined, such as CIF-linking, pathloss-linking, UL timing reference-linking, etc., and can also include determining whether the UL carriers are SIB-linked to any other DL carriers. At 506, the one or more UL carriers can be deactivated based at least in part on the linking.

Figure 6:
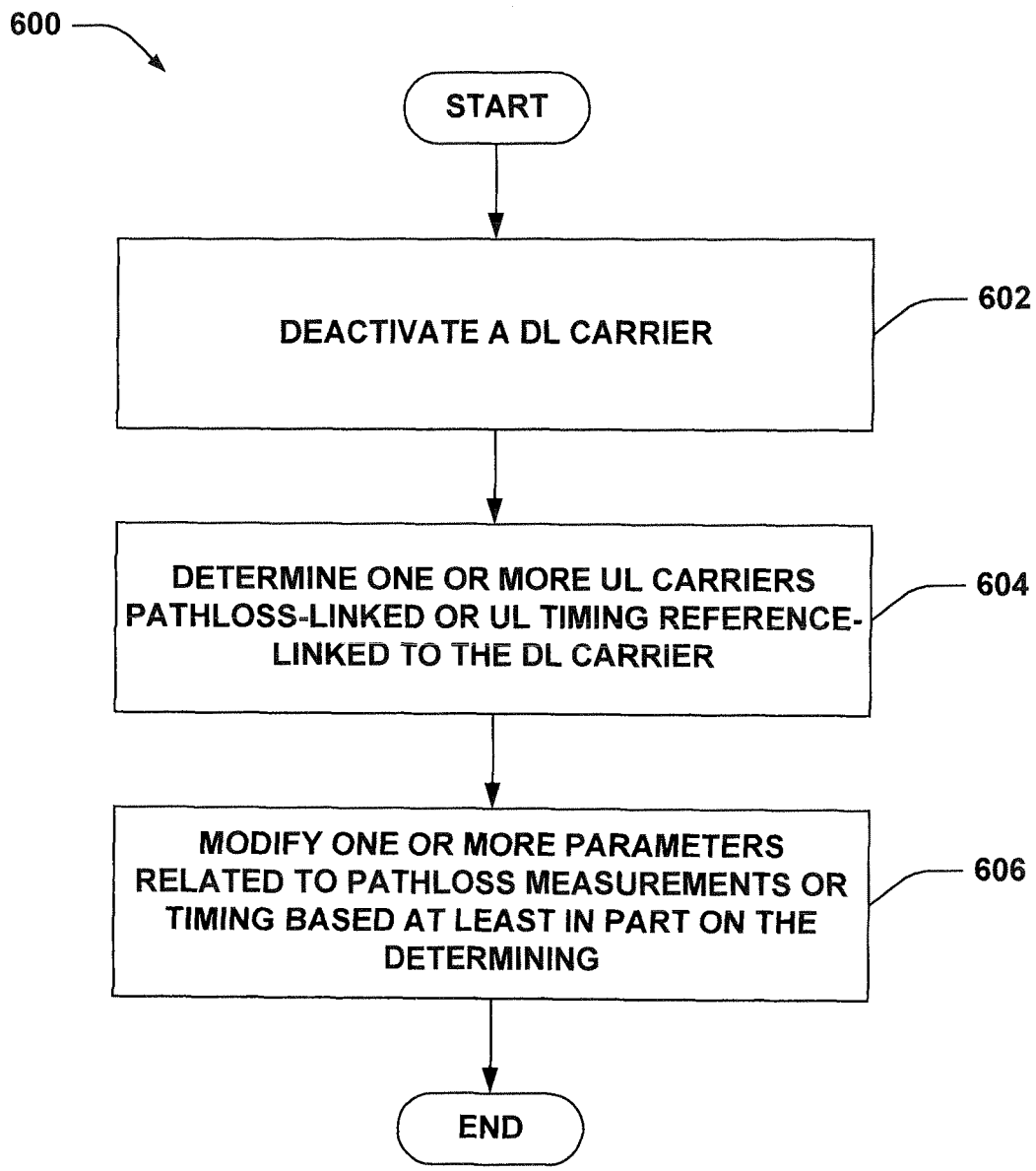
FIG. 6 is a flow chart of an aspect of a methodology for modifying parameters related to pathloss and/or uplink timing.

Turning to FIG. 6, an example methodology 600 is illustrated for relaxing pathloss and/or UL timing reference requirements based on deactivating a DL carrier. At 602, a downlink carrier can be deactivated. At 604, one or more UL carriers that are pathloss-linked or UL timing reference-linked to the downlink carrier can be determined. This can be based on a stored association, for example, as described. At 606, one or more parameters related to pathloss measurements or timing can be modified based at least in part on the determining. For example, this can relax requirements for reporting pathloss or timing.

It will be appreciated that, in accordance with one or more aspects described herein, inferences can be made regarding deactivating one or more carriers, determining a linking of the one or more carriers, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
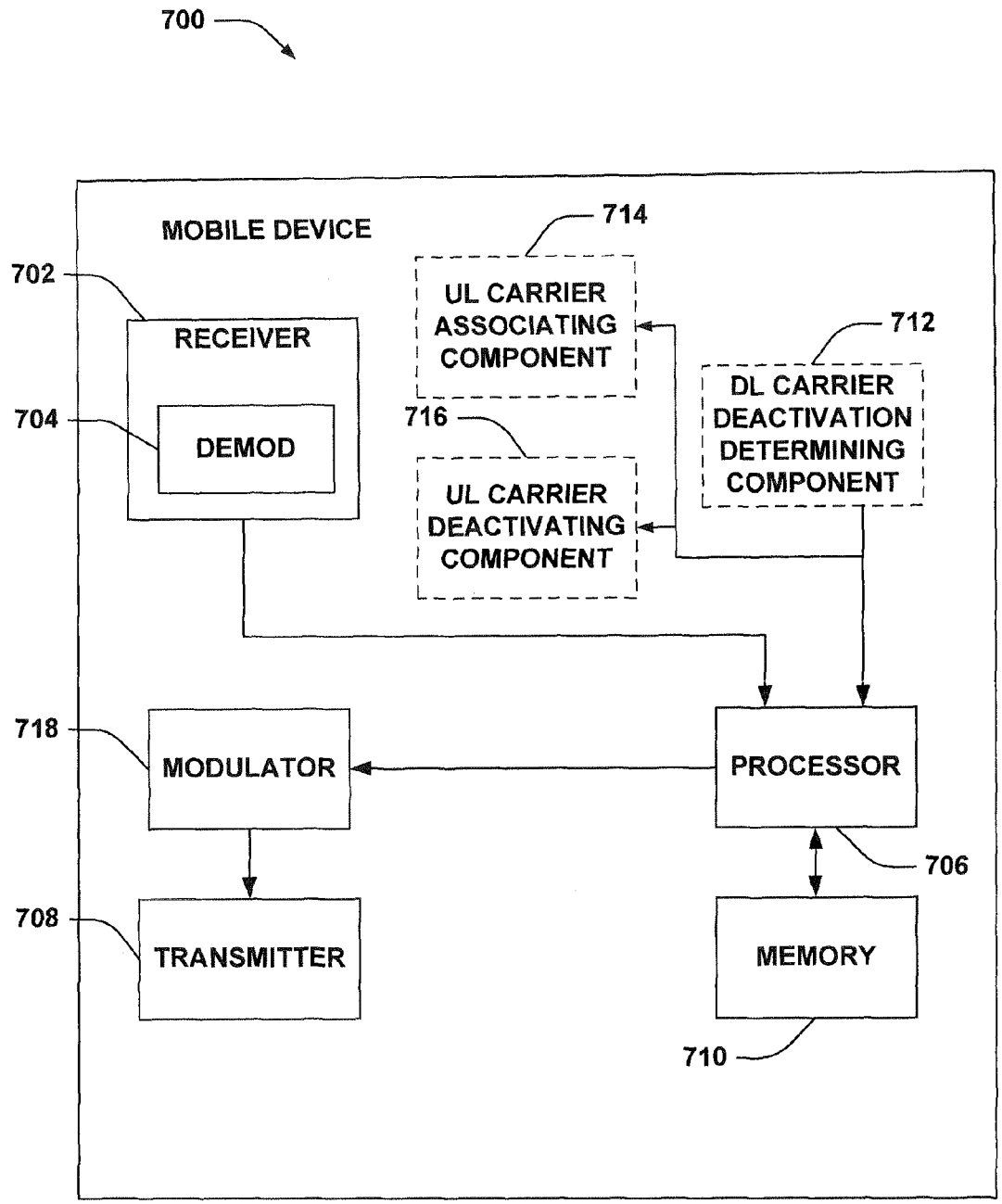
FIG. 7 is a block diagram of an example mobile device that deactivates one or more uplink carriers.

FIG. 7 is an illustration of a mobile device 700 that can communicate in a wireless network. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 708, a processor that controls one or more components of mobile device 700, and/or a processor that both analyzes information received by receiver 702, generates information for transmission by transmitter 708, and controls one or more components of mobile device 700.

Mobile device 700 can additionally comprise memory 710 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 710 can additionally store protocols and/or algorithms associated with estimating and/or utilizing a channel (e.g., performance based, capacity based, etc.), determining a linking between UL and DL carriers, deactivating a UL carrier, etc.

It will be appreciated that the data store (e.g., memory 710) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 710 of the subject systems and methods is intended to comprise, without being limited to, these and any other suitable types of memory.

Processor 706 can further be optionally operatively coupled to DL carrier deactivation determining component 712, which can be similar to DL carrier deactivation determining component 206, a UL carrier associating component 714, which can be similar to UL carrier associating component 208, and/or a UL carrier deactivating component 716, which can be similar to UL carrier deactivating component 210. Mobile device 700 still further comprises a modulator 718 that modulates signals for transmission by transmitter 708 to, for instance, a base station, another mobile device, etc.

Moreover, for example, mobile device 700 can comprise multiple transmitters 708 for multiple network interfaces, as described. Although depicted as being separate from the processor 706, it is to be appreciated that the demodulator 704, DL carrier deactivation determining component 712, UL carrier associating component 714, UL carrier deactivating component 716, and/or modulator 718 can be part of the processor 706 or multiple processors (not shown).

Figure 8:
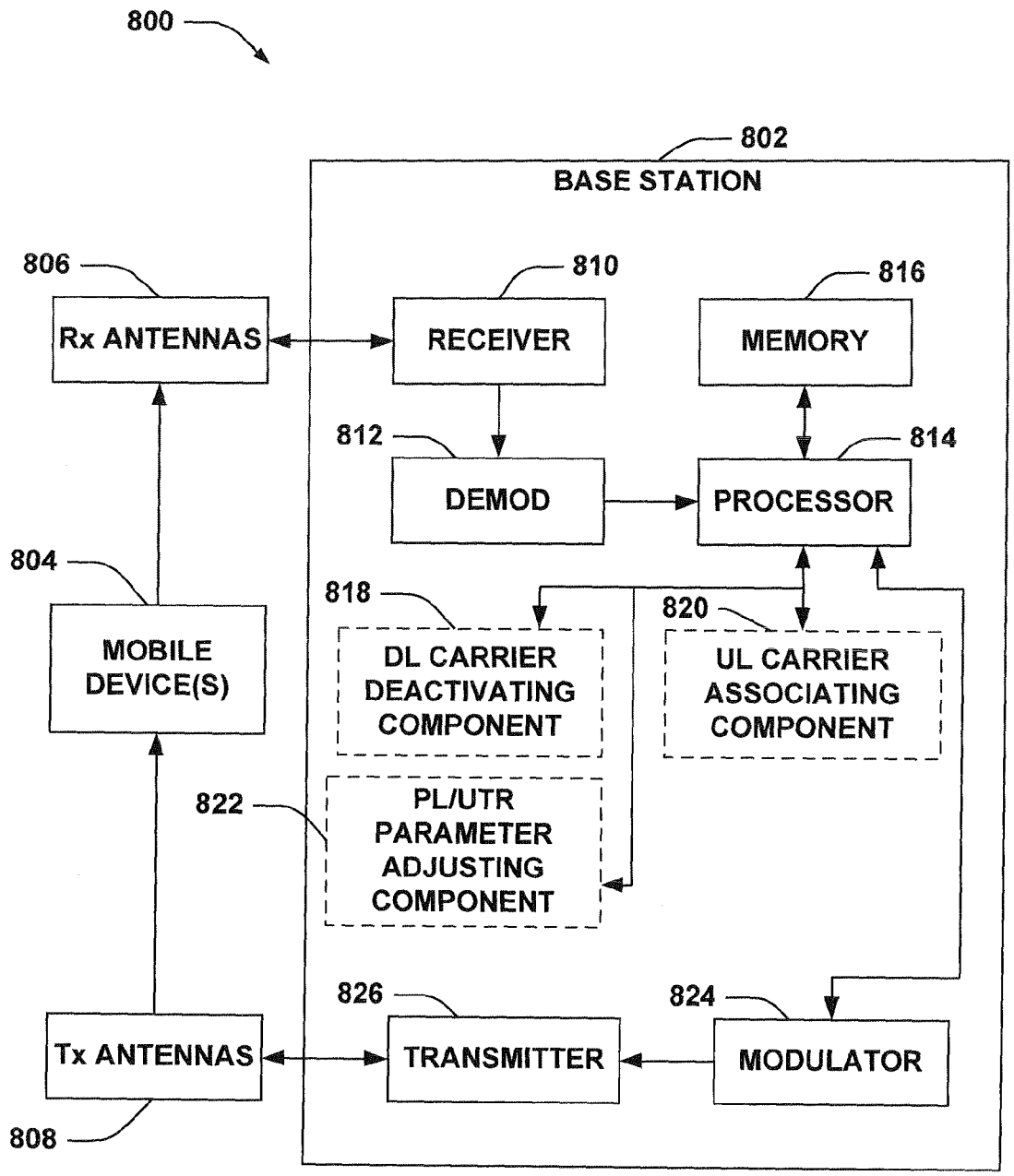
FIG. 8 is a block diagram of an aspect of a system that modifies parameters related to pathloss and/or uplink timing.

FIG. 8 is an illustration of a system 800 that facilitates adjusting pathloss and/or UL timing reference based on deactivating a DL carrier. System 800 comprises a base station 802, which can be substantially any base station (e.g., a small base station, such as a femtocell, picocell, etc., mobile base station . . . ), etc., having a receiver 810 that receives signal(s) from one or more mobile devices 804 through a plurality of receive antennas 806 (e.g., which can be of multiple network technologies, as described), and a transmitter 826 that transmits to the one or more mobile devices 804 through a plurality of transmit antennas 808 (e.g., which can be of multiple network technologies, as described). In addition, in one example, transmitter 826 can transmit to the mobile devices 804 over a wired front link. Receiver 810 can receive information from one or more receive antennas 806 and is operatively associated with a demodulator 812 that demodulates received information. In addition, in an example, receiver 810 can receive from a wired backhaul link. Though depicted as separate antennas, it is to be appreciated that at least one of receive antennas 806 and a corresponding one of transmit antennas 808 can be combined as the same antenna. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), adjusting parameters related to a pathloss, UL timing reference, etc., and/or any other suitable information related to performing the various actions and functions set forth herein.

Processor 814 is further optionally coupled to a DL carrier deactivating component 818, which can be similar to DL carrier deactivating component 212, a UL carrier associating component 820, which can be similar to UL carrier associating component 214, and/or a pathloss/UL timing reference parameter adjusting component 822, which can be similar to pathloss/UL timing reference parameter adjusting component 216.

Moreover, for example, processor 814 can modulate signals to be transmitted using modulator 824, and transmit modulated signals using transmitter 826. Transmitter 826 can transmit signals to mobile devices 804 over Tx antennas 808. Furthermore, although depicted as being separate from the processor 814, it is to be appreciated that the DL carrier deactivating component 818, UL carrier associating component 820, pathloss/UL timing reference parameter adjusting component 822, demodulator 812, and/or modulator 824 can be part of the processor 814 or multiple processors (not shown), and/or stored as instructions in memory 816 for execution by processor 814.

Figure 9:
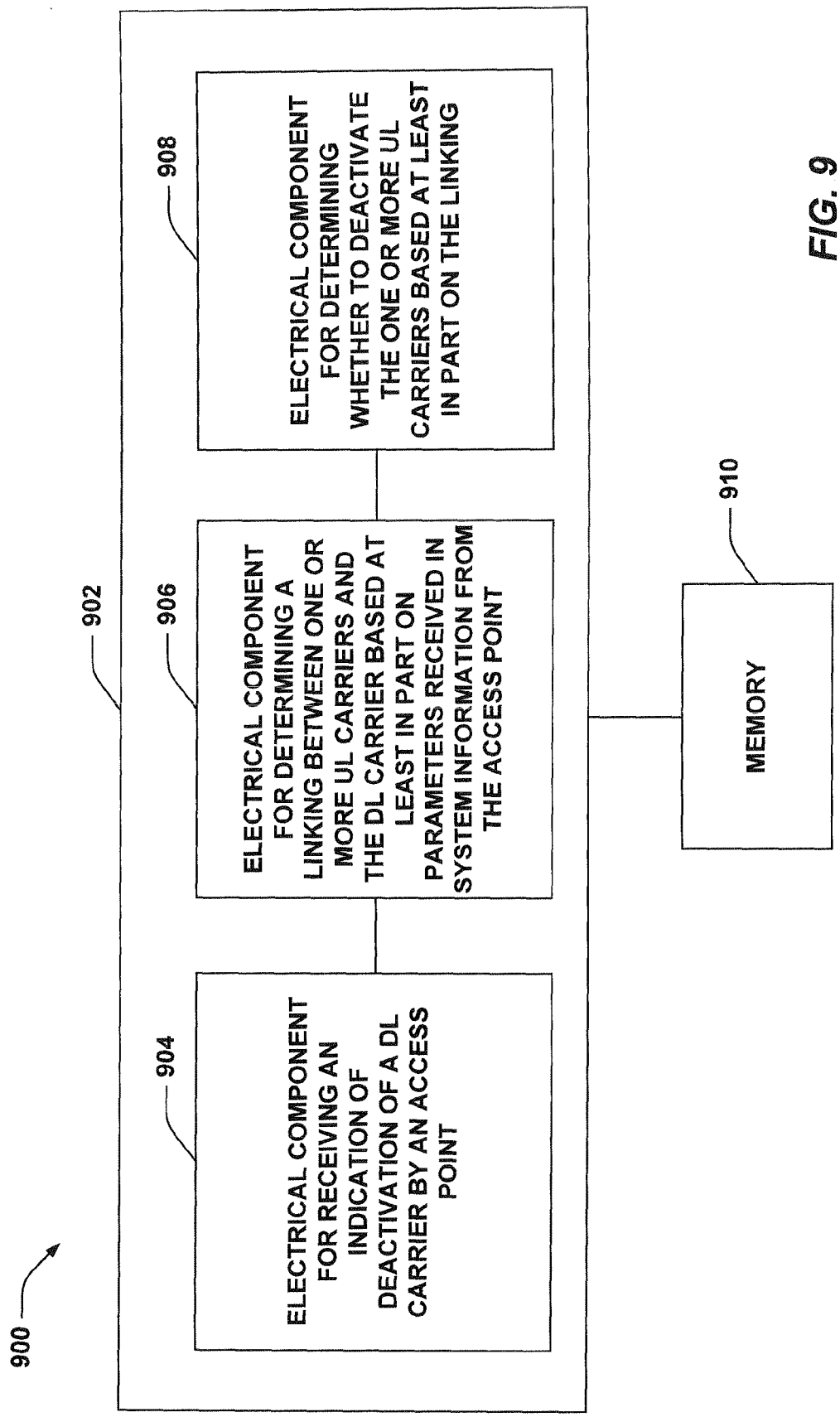
FIG. 9 is a block diagram of an aspect of a system for deactivating one or more uplink carriers based on a linking to a downlink carrier.

With reference to FIG. 9, illustrated is a system 900 that deactivates one or more UL carriers. For example, system 900 can reside at least partially within a device. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component for receiving an indication of deactivation of a DL carrier by an access point 904. As described, this can be an indication received from the access point. Further, logical grouping 902 can comprise an electrical component for determining a linking between one or more UL carriers and the DL carrier based at least in part on parameter received in system information from the access point 906.

As described, for example, other linkings can be determined between the one or more UL carriers and the DL carriers (or to one or more other DL carriers). In addition, logical grouping 902 can also comprise an electrical component for determining whether to deactivate the one or more UL carriers based at least in part on the linking 908. For example, electrical component 904 can include a DL carrier deactivation determining component 206, as described above. In addition, for example, electrical component 906, in an aspect, can include a UL carrier associating component 208, as described above. Moreover, electrical component 908 can include a UL carrier deactivating component 210, for example.

Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910. In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
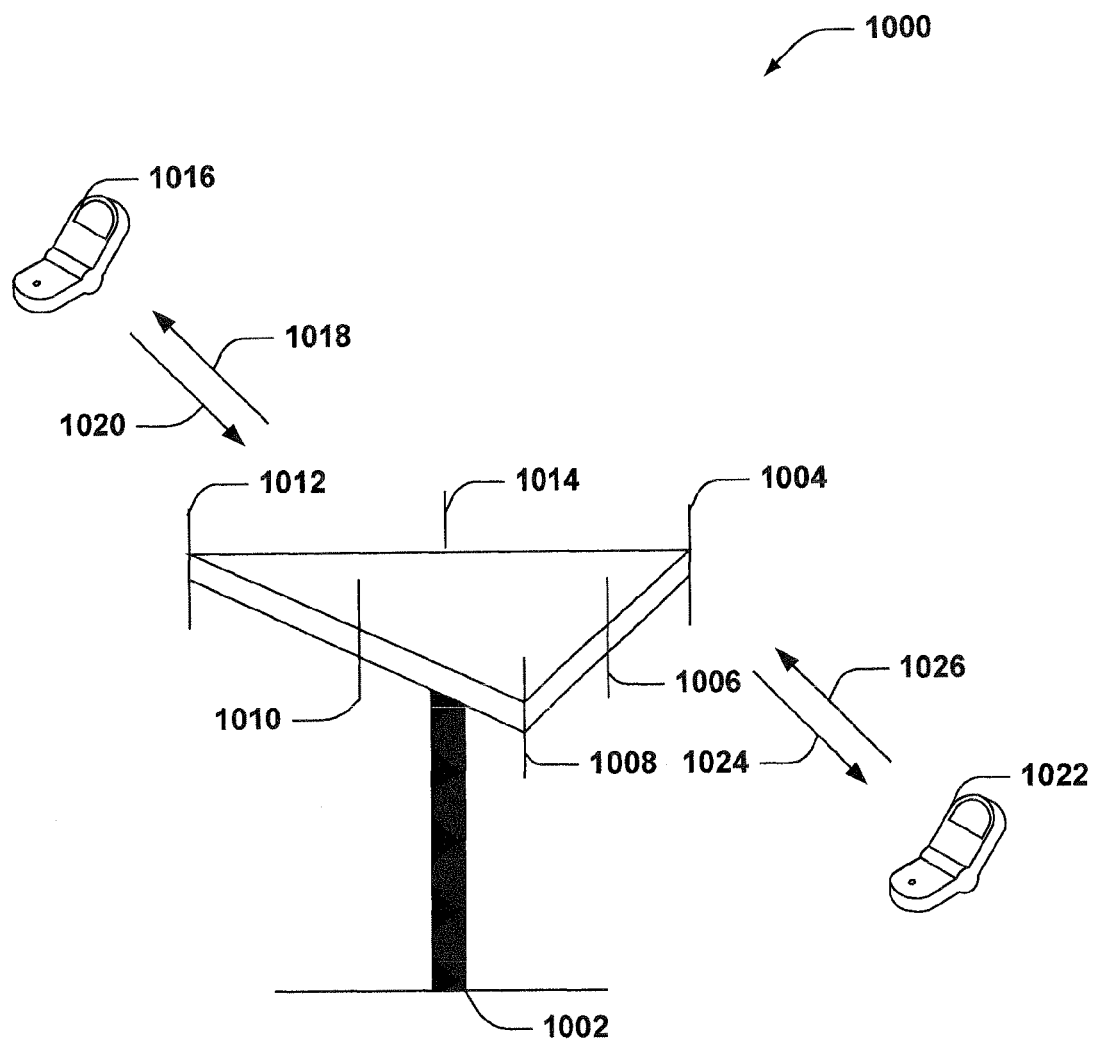
FIG. 10 is a block diagram of an aspect of a wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system or similar system that allows assigning multiple carriers between base station 1002 and mobile devices 1016 and/or 1022.

Figure 11:
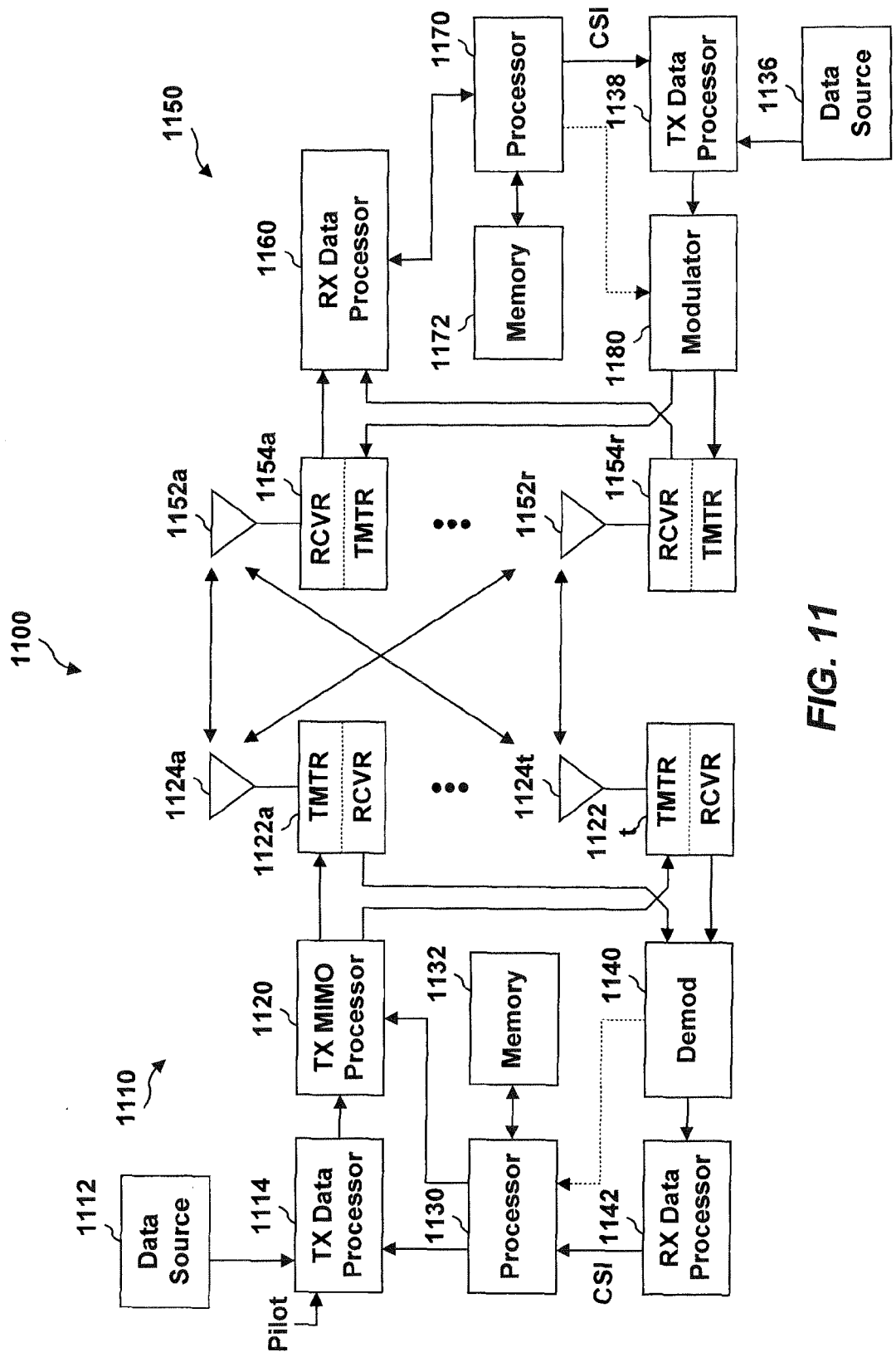
FIG. 11 is a schematic block diagram of an aspect of a wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-2 and 8-10), carrier configurations (FIG. 3), methods (FIGS. 4-6), and/or mobile devices (FIG. 7) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively. Processors 1130 and 1170 can also deactivate carriers, determine a linking, etc., as described.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for deactivating carriers in wireless communications, comprising:
receiving an indication of deactivation of a downlink carrier by an access point, wherein the indication of deactivation of the downlink carrier is received on a downlink carrier of one or more configured downlink carriers;
determining a linking between an uplink carrier and the downlink carrier based at least in part on parameters received in system information from the access point; and deactivating the uplink carrier based at least in part on the linking, if the uplink carrier is not linked to any other active downlink carrier according to the system information.

2. The method of claim 1, wherein the determining the linking is further based at least in part on at least one of a carrier indicator field (CIF)-linking between the uplink carrier and the downlink carrier, a pathloss-linking between the uplink carrier and the downlink carrier, or an uplink timing reference-linking between the uplink carrier and the downlink carrier.

3. The method of claim 2, wherein the determining the linking is further based at least in part on the CIF-linking and further includes determining that the uplink carrier is not CIF-linked to any active downlink carrier.

4. The method of claim 1, wherein the deactivating the uplink carrier includes reducing transmission of reference signal over the uplink carrier.

5. The method of claim 1, wherein the deactivating the uplink carrier includes reducing processing of scheduling information related to the uplink carrier.

6. The method of claim 5, wherein the reducing processing comprises reducing attempts to the receive scheduling information related to the uplink carrier based at least in part on avoiding receiving over intervals at which the scheduling information is transmitted.

7. The method of claim 6, further comprising determining the intervals based at least in part on a configuration of carriers in the scheduling information or an association between the uplink carrier and an active downlink carrier in the system information.

8. An apparatus for deactivating carriers in wireless communications, comprising:
at least one processor configured to:
receive an indication of deactivation of a downlink carrier by an access point, wherein the indication of deactivation of the downlink carrier is received on a downlink carrier of one or more configured downlink carriers;
determine a linking between an uplink carrier and the downlink carrier based at least in part on parameters received in system information from the access point; and
deactivate the uplink carrier based at least in part on the linking, if the uplink carrier is not linked to any other active downlink carrier according to the system information; and
a memory coupled to the at least one processor.

9. The apparatus of claim 8, wherein the at least one processor is further configured to determine the linking at least in part by determining at least one of a carrier indicator field (CIF)-linking between the uplink carrier and the downlink carrier, a pathloss-linking between the uplink carrier and the downlink carrier, or an uplink timing reference-linking between the one or more uplink carrier and the downlink carrier.

10. The apparatus of claim 9, wherein the at least one processor is further configured to determine the linking based at least in part on the CIF-linking and further configured to determine that the uplink carrier is not CIF-linked to another downlink carrier.

11. The apparatus of claim 8, wherein the at least one processor is further configured to deactivate the uplink carrier at least in part by reducing transmission of reference signals over the uplink carrier.

12. The apparatus of claim 8, wherein the at least one processor is further configured to deactivate the uplink carrier at least in part by reducing processing of scheduling information related to the uplink carrier.

13. The apparatus of claim 12, wherein the at least one processor is further configured to reduce processing of scheduling information at least in part by reducing attempts to receive the scheduling information related to the uplink carrier based at least in part on avoiding receiving over intervals at which the scheduling information is transmitted.

14. The apparatus of claim 13, wherein the at least one processor is further configured to determine the intervals based at least in part on a configuration of carriers in the scheduling information or an association between the uplink carrier and an active downlink carrier in the system information.

15. An apparatus for deactivating carriers in wireless communications, comprising:
means for receiving an indication of deactivation of a downlink carrier by an access point, wherein the indication of deactivation of the downlink carrier is received on a downlink carrier of one or more configured downlink carriers;
means for determining a linking between an uplink carrier and the downlink carrier based at least in part on parameters received in system information from the access point; and
means for deactivating the uplink carrier based at least in part on the linking, if the uplink carrier is not linked to any other active downlink carrier according to the system information.

16. The apparatus of claim 15, wherein the means for determining determines at least one of a carrier indicator field (CIF)-linking between the uplink carrier and the downlink carrier, a pathloss-linking between the uplink carrier and the downlink carrier, or an uplink timing reference-linking between the uplink carrier and the downlink carrier.

17. The apparatus of claim 16, wherein the means for determining determines the CIF-linking and that the uplink carrier is not CIF-linked to another downlink carrier.

18. The apparatus of claim 15, wherein the means for deactivating deactivates the uplink carrier at least in part by reducing transmission of reference signal over the uplink carrier.

19. The apparatus of claim 15, wherein the means for deactivating deactivates the uplink carrier at least in part by reducing processing of scheduling information related to the uplink carrier.

20. The apparatus of claim 19, wherein the means for deactivating reduces processing the scheduling information at least in part by reducing attempts to receive scheduling information related to the uplink carrier based at least in part on avoiding receiving over intervals at which the scheduling information is transmitted.

21. The apparatus of claim 20, wherein the means for deactivating further determines the intervals based at least in part on a configuration of carriers in the scheduling information or an association between the uplink carrier and an active downlink carrier in the system information.

22. A computer program product for deactivating carriers in wireless communications, comprising:
a non-transitory computer-readable medium, comprising:
code for causing at least one computer to receive an indication of deactivation of a downlink carrier by an access point, wherein the indication of deactivation of the downlink carrier is received on a downlink carrier of one or more configured downlink carriers;
code for causing the at least one computer to determine a linking between an uplink carrier and the downlink carrier based at least in part on parameters received in system information from the access point; and p2 code for causing the at least one computer to deactivate the uplink carrier based at least in part on the linking, if the uplink carrier is not linked to any other active downlink carrier according to the system information.

23. The computer program product of claim 22, wherein the code for causing the at least one computer to determine further determines the linking at least in part by determining that the uplink carrier is not linked to another downlink carrier according to the system information.

24. The computer program product of claim 22, wherein the code for causing the at least one computer to determine further determines the linking at least in part by determining at least one of a carrier indicator field (CIF)-linking between the uplink carrier and the downlink carrier, a pathloss-linking between the uplink carrier and the downlink carrier, or an uplink timing reference-linking between the uplink carrier and the downlink carrier.

25. The computer program product of claim 24, wherein the code for causing the at least one computer to determine further determines the linking based at least in part on the CIF-linking and further determining that the uplink carrier is not CIF-linked to another downlink carrier.

26. The computer program product of claim 22, wherein the code for causing the at least one computer to deactivate deactivates the uplink carrier at least in part by reducing transmission of reference signal over the uplink carrier.

27. The computer program product of claim 22, wherein the code for causing the at least one computer to deactivate deactivates the uplink carrier at least in part by reducing processing of scheduling information related to the one or more uplink carriers.

28. The computer program product of claim 27, wherein the code for causing the at least one computer to determine reduces processing the scheduling information at least in part by reducing attempts to receive scheduling information related to the uplink carrier based at least in part on avoiding receiving over intervals at which the scheduling information is transmitted.

29. The computer program product of claim 28, wherein the computer-readable medium further comprises code for causing the at least one computer to determine the intervals based at least in part on a configuration of carriers in the scheduling information or an association between the uplink carrier and an active downlink carrier in the system information.

30. An apparatus for deactivating carriers in wireless communications, comprising:
a downlink carrier deactivation determining component for receiving an indication of deactivation of a downlink carrier by an access point, wherein the indication of deactivation of the downlink carrier is received on a downlink carrier of one or more configured downlink carriers;
an uplink carrier associating component for determining a linking between an uplink carrier and the downlink carrier based at least in part on parameters received in system information from the access point; and
an uplink carrier deactivating component for deactivating the uplink carrier based at least in part on the linking, if the uplink carrier is not linked to any other active downlink carrier according to the system information.

31. The apparatus of claim 30, wherein the uplink carrier associating component determines at least one of a carrier indicator field (CIF)-linking between the uplink carrier and the downlink carrier, a pathloss-linking between the uplink carrier and the downlink carrier, or an uplink timing reference-linking between the uplink carrier and the downlink carrier.

32. The apparatus of claim 31, wherein the uplink carrier associating component determines the CIF-linking and that the uplink carrier is not CIF-linked to another downlink carrier.

33. The apparatus of claim 30, wherein the uplink carrier deactivating component deactivates the uplink carrier at least in part by reducing transmission of reference signal over the uplink carrier.

34. The apparatus of claim 30, wherein the uplink carrier deactivating component deactivates the uplink carrier at least in part by reducing processing of scheduling information related to the uplink carrier.

35. The apparatus of claim 34, wherein the uplink carrier deactivating component reduces processing the scheduling information at least in part by reducing attempts to receive scheduling information related to the uplink carrier based at least in part on avoiding receiving over intervals at which the scheduling information is transmitted.

36. The apparatus of claim 35, wherein the uplink carrier deactivating component further determines the intervals based at least in part on a configuration of carriers in the scheduling information or an association between the uplink carrier and an active downlink carrier in the system information.

37. The method of claim 1, wherein the linking is based on whether the downlink carrier and the uplink carrier are system information broadcast (SIB) linked carriers.

38. The method of claim 37, wherein a set of the SIB linked carriers is configured as a Scell.

39. The apparatus of claim 8, wherein the at least one processor further determines whether the downlink carrier and the uplink carrier is system information broadcast (SIB) linked.

40. The apparatus of claim 39, wherein a set of the SIB linked carriers is a Scell.

41. The apparatus of claim 15, wherein the means for determining further determines whether the downlink carrier and the uplink carrier are system information broadcast (SIB) linked.

42. The apparatus of claim 41, wherein a set of the SIB linked carriers is a Scell.

* * * * *